April 14, 1959 P. D. WILLIAMS 2,882,116
METHOD OF MAKING ELECTRON TUBES

Filed Sept. 20, 1956 2 Sheets-Sheet 1

INVENTOR.
Paul D. Williams
BY Leon F. Herbert
ATTORNEY

United States Patent Office 2,882,116
Patented Apr. 14, 1959

2,882,116

METHOD OF MAKING ELECTRON TUBES

Paul D. Williams, Menlo Park, Calif., assignor to Eitel-McCullough, Inc., San Bruno, Calif., a corporation of California Application September 20, 1956, Serial No. 610,969

8 Claims. (Cl. 316—19)

This invention relates to a method of making electron tubes and more particularly to a method of making tubes which do not have exhaust tubulation.

In the patent to J. A. McCullough, No. 2,713,532, dated July 19, 1955, a method for making tubes without exhaust tubulation has already been disclosed. According to the method described in said patent, a tube is placed in a vacuum chamber with brazing material applied to the joints between the various envelope sections. The chamber is then evacuated for as long as is necessary to obtain the desired vacuum in the tube. Finally, the brazing material is heated to brazing temperature to form vacuum-tight seals between the various envelope sections.

It will be understood by those skilled in the art that when a tube is assembled in a vacuum chamber the tube parts fit together to form a closed envelope. Accordingly, there is very little space between the envelope sections through which gas can escape from the tube into the vacuum chamber. Therefore, a considerable length of evacuating time is required to achieve the desired degree of vacuum within the tube. This situation was realized in the McCullough Patent No. 2,713,532 in which it is proposed that one solution is to provide mechanism external to the tube whereby the various envelope sections can be held separated during the evacuation process and then displaced to close the tube prior to brazing.

An object of the present invention is to provide a method of pumping electron tubes in an air-tight chamber in such a way that ample ducting space is provided between the envelope sections without requiring the use of apparatus external to the tube.

A further object of the invention is to provide a method of making tubes in which the parts which cooperate to form the tube envelope serve to hold various envelope sections in spaced position until the desired atmosphere has been obtained within the tube.

Another object of the invention is to provide a method of making electron tubes which involves forming adjacent envelope sections to have dissimilar abutting surfaces, obtaining the desired atmosphere in said tube while in an air-tight chamber, and then deforming said surfaces until they have the same shape and make a vacuum-tight seal.

A further object of the invention is to provide a method of making electron tubes which involves assembling the envelope parts in an air-tight chamber with adjacent parts being separated by bonding material which does not entirely close the space between said parts, obtaining the desired atmosphere in the tube by providing such atmosphere in the chamber, and then deforming said bonding material to form a vacuum-tight seal between said parts.

Another object of the invention is to provide a method of pumping electron tubes in an air-tight chamber which involves assemblying in the chamber a tube having envelope sections with dissimilar abutting surfaces, obtaining the desired atmosphere in said tube by providing such atmosphere in the chamber, regardless of whether the desired atmosphere be vacuum or gaseous, and then deforming said dissimilar surfaces until they have the same shape and make a vacuum-tight seal.

The invention possesses other objects and features of advantage, some of which, with the foregoing, will be set forth in the following description of the invention. It is to be understood that the invention is not limited to the disclosed species, as variant embodiments thereof are contemplated and may be adopted within the scope of the claims.

Referring to the drawings.

Figure 1:
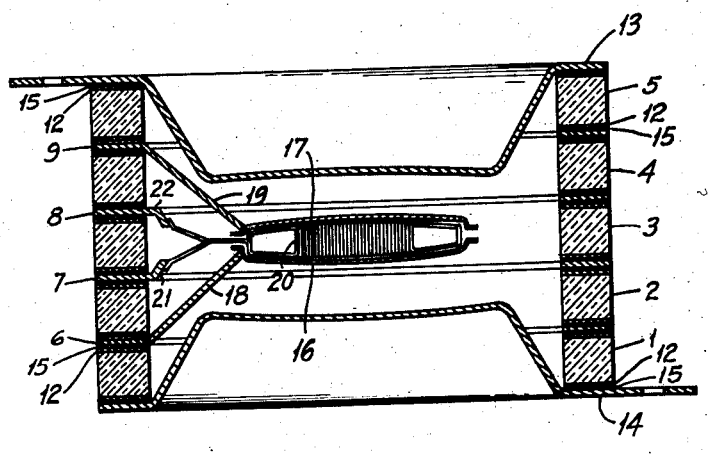
Figure 1 is a cross-sectional view of an electron tube made by the method of this invention.

Referring in more detail to the drawings, Figure 1 shows a completed electron tube made in accordance with the method of this invention. The tube per se is similar to that disclosed and claimed in the co-pending application of J. A. McCullough, et al., Serial No. 486,199, assigned to Eitel-McCullough Inc. It should be understood, however, that any electron tube having abutting envelope sections can be made in accordance with the invention.

The specific tube disclosed by way of example is a duodiode comprising as evacuated envelope of generally cylindrical shape. More specifically, the tube comprises a series of five ceramic rings 1, 2, 3, 4 and 5 with four flat metal rings 6, 7, 8 and 9 sandwiched therebetween. The ceramic rings are preferably made of high alumina ceramic material and are metalized at each end as indicated at 12 in Figure 1. Various known metallizing procedures can be employed. For example, the ends of the ceramic rings can be coated with a mixture of molybdenum and manganese powders and then fired in hydrogen at a temperature of about 1300° C.

In addition to the ceramic and metal rings, the parts which form the tube envelope include end members 13 and 14 and the brazing material 15, such as copper-silver eutectic alloy. The end members 13 and 14 serve also as anodes, and the brazing material 15 serves to join the metalized ends of the ceramic rings to the adjacent metal parts. Within the tube envelope a pair of cathode disks 16 and 17 are supported by one or more spokes 18 and 19 extending inwardly from metal rings 6 and 9. A heater coil 20 is positioned between the cathode disks, with the two ends of the coil attached respectively to the projections 21 and 22 extending inwardly from rings 7 and 8.

Figure 2:
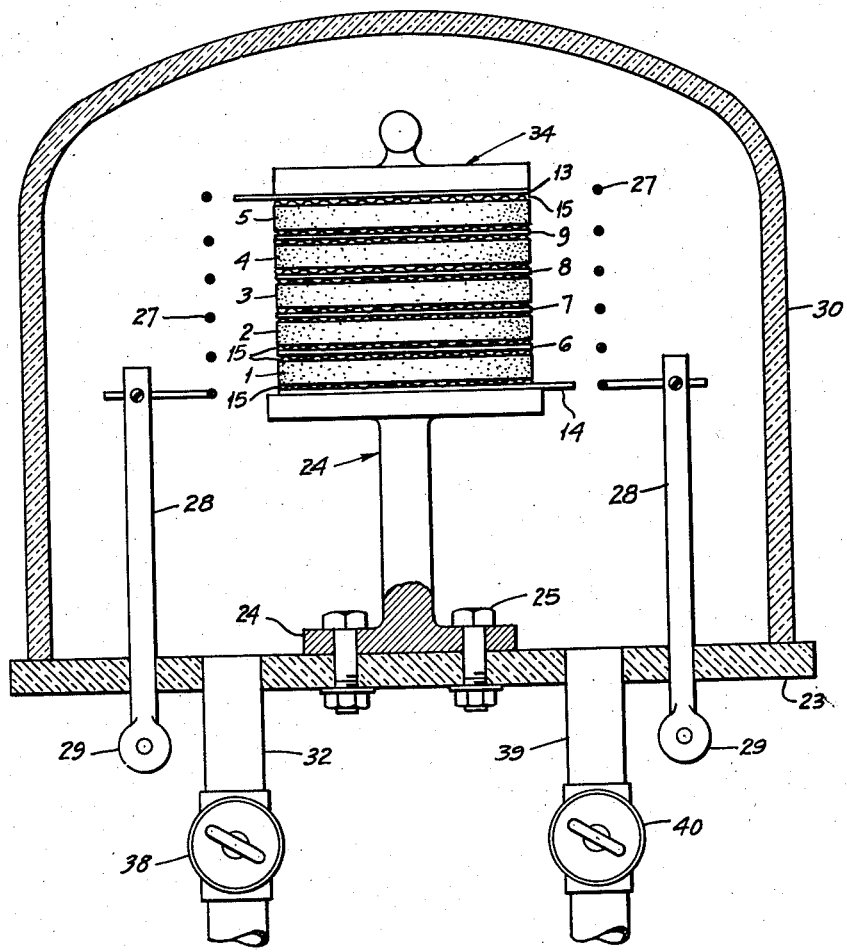
Figure 2 is a cross-sectional view of a vacuum chamber and shows in elevation a tube assembled within the chamber with the tube parts in the positions occupied during the evacuation process.

A suitable air-tight vacuum chamber is shown in Figure 2 and comprises a base plate 23 which is preferably made of dielectric material. A tube stand 24 is mounted on the base plate by means of bolts 25. A heating coil 27 is supported above the base plate by means of rods 28 which are carried by the base plate and extend therethrough to form teminals 29. A cup-shaped member 30, preferably of dielectric material, is supported in inverted position on the base plate 23 to complete the vacuum chamber. Evacuation of the chamber is accomplished through the exhaust tube 32 which goes to suitable pumping apparatus. As will be understood by those skilled in the art, all of the joints in the vacuum chamber are sealed to form a vacuum-tight enclosure.

Figure 3:
Figure 3 is an enlarged half-sectional view of one of the brazing rings shown in Figure 2.

In order to make a completed tube the various parts are stacked on stand 24 within the vacuum chamber as shown in Figure 2. It will be noted in Figures 2 and 3 that the brazing rings 15 have a corrugated shape prior to melting and thus serve to hold the ceramic rings and metal ring in spaced relation. Obviously not all of the brazing rings need be corrugated because an exhaust passage would be provided if only one such ring were employed and the remainder were conventional flat rings. Similarly, some of the ceramic and metal parts could even be brazed together prior to insertion in the vacuum chamber. However, maximum evacuation area is naturally obtained by making all of the brazing rings corrugated.

After the vacuum chamber has been exhausted and the air within the tube has been withdrawn through the spaces provided by the corrugated brazing rings 15, the heating coil 27 is energized. As the brazing rings are heated and approach the molten state they flatten out and the brazing material entirely closes the space between the ceramic and metal parts to form vacuum-tight seals.

It will be understood that as the brazing material approaches the molten state the weight of the envelope parts will cause them to close together to obtain strong vacuum-tight brazes. However, in order to increase this action, it is desirable to place a weight 34 on top of the tube, particularly for tubes in which the uppermost envelope part is relatively light in weight.

Figure 4:
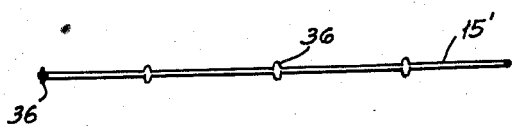
Figure 4 is a half-sectional view of a modified form of brazing ring.

Figure 4 discloses a modified shape for the brazing material which is simply a ring of brazing wire 15' that has been pinched at various points spaced therealong to form raised portions 36. It will be understood that various other shapes can be employed for the brazing material as long as the shape of the material is different from the abutting surface of at least one adjacent envelope part so that a passageway for gas is provided between the interior to the vacuum chamber and the interior of the envelope.

The apparatus and method thus far described is used in the manufacture of vacuum tubes. The manufacture of gaseous tubes requires additional apparatus and method steps which will now be described. It will be noted that a valve 38 is provided in the exhaust tube 32. In addition an inlet tube 39 is sealed in base plate 23 and is provided with a valve 40. As will be understood by those skilled in the art, inlet line 39 goes to a source of the desired gaseous substance, such as hydrogen gas or mercury vapour.

In order to manufacture a gaseous tube, the tube parts are assembled in the vacuum chamber as shown in Figure 2, in the same manner as for a vacuum tube. The tube is then evacuated by evacuating the chamber, with valve 38 open and valve 40 closed. Next, valve 38 in the exhaust line 32 is closed and valve 40 in the inlet line 39 is opened to admit the desired gaseous substance. When the desired amount of gas or vapour has been admitted to the interior of the tube, the coil 27 is energized and brazing rings 15 are heated to brazing temperature. Thus it will be understood that the invention can be employed in connection with any desired tube atmosphere, regardless of whether such atmosphere be vacuum or gaseous.

I claim:

1. A method of making an electron tube having a pair of envelope parts sealed together by bonding material, said method comprising the steps of forming out of said bonding material a member having a surface configuration different from the surface configuration of one of said envelope parts, positioning said parts in stacked assembly in an air-tight chamber with said member between said parts and said dissimilar surfaces adjacent one another to form therebetween passages connecting the inside of said tube with the inside of said chamber, obtaining the desired atmosphere in said tube by providing such atmosphere in said chamber, and then deforming said member until said surface configuration thereof matches said adjacent dissimilar surface configuration of said one part and said bonding material of which said member is composed forms a vacuum-tight seal between said envelope parts.

2. A method of making an electron tube having a pair of envelope parts sealed together by bonding material, said method comprising the steps of forming out of said bonding material a member having a surface configuration different from the surface configuration of one of said envelope parts, positioning said parts in stacked assembly in an air-tight chamber with said member between said parts and said dissimilar surfaces adjacent one another to form therebetween passages connecting the inside of said tube with the inside of said chamber, obtaining the desired atmosphere in said tube by providing such atmosphere in said chamber, and then heating and compressing said parts until said adjacent surfaces have the same configuration and a vacuum-tight seal is formed.

3. A method of making an electron tube having a plurality of envelope sections, comprising the steps of positioning said sections in an air-tight chamber with bonding material holding said sections apart and filling only part of the space between said sections, obtaining the desired atmosphere in said tube by providing such atmosphere in said chamber while said sections are held apart by the bonding material, and then deforming said bonding material to close the entire space between said sections and to join the sections together in a vacuum-tight seal.

4. A method of making an electron tube having a plurality of envelope sections, comprising the steps of positioning said sections in an air-tight chamber with brazing material holding said sections apart and filling only part of the space between said sections, obtaining the desired atmosphere in said tube by providing such atmosphere in said chamber while said sections are held apart by the brazing material, and then heating said brazing material to brazing temperature while said sections are in the same positions they occupied during the step of obtaining the desired vacuum in the tube.

5. A method of making an electron tube having an envelope comprising a ceramic section having a planar metalized surface and a metal section having a planar surface adjacent said metalized surface, comprising the steps of forming a piece of brazing material having a non-planar surface, positioning said tube in an air-tight chamber with said brazing piece between said envelope sections and the non-planar surface of said brazing piece abutting one of said planar surfaces, obtaining the desired atmosphere in said tube by providing such atmosphere in said chamber, and then forming a vacuum-tight seal between said envelope sections by heating said brazing piece to brazing temperature.

6. A method of making an electron tube having two envelope sections with adjacent metallic surfaces, comprising the steps of forming a corrugated piece of brazing material, positioning said tube in an air-tight chamber with said brazing piece between said envelope sections and the ridges of said corrugated piece abutting said metallic surfaces, obtaining the desired atmosphere in said tube by providing such atmosphere in said chamber, and then forming a vacuum-tight seal between said envelope sections by heating said brazing piece to brazing temperature.

7. A method of making an electron tube having two envelope sections with adjacent metallic surfaces, comprising the steps of pinching a piece of brazing wire at various points spaced along its length to form raised portions, positioning said tube in an air-tight chamber with said brazing wire between said envelope sections and the raised portions of said wire abutting said metallic surfaces, obtaining the desired atmosphere in said tube by providing such atmosphere in said chamber, and then forming a vacuum-tight seal between said envelope sections by heating said wire to brazing temperature.

8. The method of making an electron tube having a plurality of envelope sections, said method comprising the steps of positioning a first envelope section in an air tight chamber, placing a member of bonding material on said first envelope section, placing a second envelope section within said chamber on said member of bonding material, the surface of said bonding material which is in contact with one of said envelope sections having a shape which is different from the shape of the contacted surface of said one envelope section, then obtaining the desired atmosphere in said envelope by providing such atmosphere in said chamber while said sections are separated by said member of bonding material, and then deforming said member of bonding material to form a vacuum-tight seal between said envelope parts.

References Cited in the file of this patent

UNITED STATES PATENTS

| | | |
|---|---|---|
| 2,680,824 | Beggs | June 8, 1954 |
| 2,731,578 | McCullough | Jan. 17, 1956 |